(12) United States Patent
Stevenson et al.

(10) Patent No.: US 7,726,637 B2
(45) Date of Patent: Jun. 1, 2010

(54) RECONFIGURABLE CLAMP AND METHOD OF USE THEREOF

(75) Inventors: Robin Stevenson, Bloomfield, MI (US); Ivan G. Sears, Rochester Hills, MI (US); Richard J. Skurkis, Lake Orion, MI (US); Jeff Dellach, Shelby Township, MI (US); Mike Vainstein, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 56 days.

(21) Appl. No.: 11/852,599

(22) Filed: Sep. 10, 2007

(65) Prior Publication Data

US 2009/0065994 A1    Mar. 12, 2009

(51) Int. Cl.
*B23Q 3/06* (2006.01)
(52) U.S. Cl. .................... 269/266; 269/287; 269/32; 269/254 CS
(58) Field of Classification Search ............... 269/266, 269/267, 32, 24–27, 20, 287, 254 CS
See application file for complete search history.

(56) References Cited

U.S. PATENT DOCUMENTS

| 2,754,708 | A | * | 7/1956 | Peterson | ................... 269/224 |
|---|---|---|---|---|---|
| 2,790,361 | A | | 4/1957 | Swanson et al. | |
| 5,224,586 | A | * | 7/1993 | Naka et al. | ............. 198/803.11 |
| 5,622,090 | A | * | 4/1997 | Marks | .......... 81/185 |
| 6,799,757 | B1 | * | 10/2004 | Lang | .......... 269/266 |
| 7,125,010 | B2 | * | 10/2006 | Moore et al. | ................ 269/266 |
| 7,364,147 | B2 | * | 4/2008 | Shinozaki | ................... 269/266 |
| 2005/0269756 | A1 | | 12/2005 | Stevenson et al. | |
| 2006/0244190 | A1 | * | 11/2006 | Erdmann | .................... 269/266 |
| 2009/0065994 | A1 | * | 3/2009 | Stevenson et al. | .......... 269/287 |

* cited by examiner

*Primary Examiner*—Lee D Wilson
(74) *Attorney, Agent, or Firm*—Quinn Law Group, PLLC

(57) ABSTRACT

A reconfigurable clamp is provided, where the clamp includes: a clamp body including a plurality of through holes formed within the clamp body; a plurality of movable pins which slidably fit within the through holes in the clamp body; wherein the movable pins incorporate a tapered section to facilitate locking of the movable pins; and wherein the clamp is reconfigurable by movement of the pins to conform to a surface geometry of an object of arbitrary shape through contact with that object. The clamped surface is represented as a series of discrete points corresponding to the ends of the plurality of pins.

16 Claims, 3 Drawing Sheets

RECONFIGURABLE CLAMP AND METHOD OF USE THEREOF

TECHNICAL FIELD

The invention relates to a reconfigurable clamp and a method of use of such a clamp.

BACKGROUND OF THE INVENTION

Clamps are used extensively to temporarily locate sheet metal parts during the fabrication of sheet metal parts, usually by spot welding, into vehicle bodies or body subassemblies. Clamps are typically specific to one vehicle body style and to one location on that body style. Thus due to variations in external sheet metal, the same clamp cannot be used on a broad range of vehicle bodies even when general similarities exist between them. Thus the number of vehicle body variants which can be fabricated on a particular body assembly line is restricted.

A reconfigurable clamp, capable of rapidly adapting to differing body configurations, increases the number of body variants which can be fabricated on a particular body assembly line and therefore increases the versatility of the body assembly line.

SUMMARY OF THE INVENTION

A reconfigurable clamp is provided, where the clamp includes: a clamp body including a plurality of through holes formed within the clamp body; a plurality of movable pins which slidably fit within the through holes in the clamp body; wherein the movable pins incorporate a tapered section to facilitate locking of the movable pins; and wherein the clamp is reconfigurable by movement of the pins to conform to a surface geometry of an object of arbitrary shape through contact with that object. The clamp is capable of sustaining a load applied to the object and enables the object to be supported and held rigidly.

In one aspect of the invention, the movable pins are aligned in a direction substantially parallel to a centerline of the clamp body; the movable pins have a specified range of motion between a maximum and minimum displacement in a direction parallel to a long axis of the movable pin; and the movable pins may be locked in a position within the specified range of motion. In another aspect of the invention, the reconfigurable clamp further includes a geometric feature to serve as a reference location. In another aspect of the invention, one end of each of the movable pins is a curved surface. The clamped surface is represented as a series of discrete points corresponding to the ends of the plurality of pins.

In another aspect of the invention, the reconfigurable clamp further includes an actuator incorporating a tapered portion in a direction parallel to the centerline of the clamp body; wherein the actuator is biased by a spring for motion in a direction parallel to the centerline of the clamp body; and wherein the actuator is operably connected to a source to enable motion of the actuator in a direction parallel to the centerline of the clamp body when the actuator is displaced against the biasing of the spring. In another aspect of the invention, the actuator has a generally conical shape.

In another aspect of the invention, the clamp further includes: a locking element at least partially located within the clamp body; and the locking element is disposed between the tapered section of the movable pins and the tapered portion of the actuator. In another aspect of the invention, the locking element is substantially spherical. In the preferred embodiment, there are three locking elements.

In another aspect of the invention, a mechanical interference is created by the interaction of the locking element, the tapered portion of the actuator and the tapered section of a movable pin, resulting in a configuration that prevents motion of the movable pin in at least one direction along the longitudinal axis of the movable pin. In another aspect of the invention, the clamp may maintain this configuration in the absence of any externally applied force. The configuration is extended to prevent motion of all the movable pins.

In another aspect of the invention, the actuator is at least partially located within the clamp body; the actuator is loosely constrained by the clamp body to motion substantially in a direction parallel to the clamp centerline; and the actuator is laterally movable to accommodate varying positions of the locking element.

In another aspect of the invention, the movable pins are biased by a pin spring towards the maximum displacement of the movable pins by a force sufficient only to overcome any friction between the movable pins and the through holes in the clamp body, when the movable pins are unlocked. In another aspect of the invention, the locking element prevents motion of the movable pins into the through holes in the clamp body against the bias of the pin springs, thereby locking the movable pins.

In another aspect of the invention, the locking element may adopt a position in which it is in contact with at least one of the tapered sections of the plurality of movable pins, i.e., when the movable pins are in a locked position. The locking element may adopt at least one position in which it is not in contact with at least one of the tapered sections of the plurality of movable pins, i.e., when the movable pins are in an unlocked position.

A method of using a reconfigurable clamp is provided where the reconfigurable clamp includes: a clamp body having a maximum extremity in a direction parallel to a centerline of the clamp; a plurality of movable pins at least partially located inside the clamp body, each of the movable pins having a contacting surface; and a locking device at least partially located inside the clamp body, wherein the locking device may mechanically interfere to prohibit motion of the movable pins.

The method includes: applying an actuation force to the clamp body to displace the locking device to a position where it does not prohibit motion of the movable pins; enabling the extension of the movable pins out of the clamp body such that they adopt a stable position in which the contacting surface of the movable pins extends beyond the maximum extremity of the clamp body in a direction parallel to the centerline of the clamp; bringing an object into contact with the contacting surface of the movable pins such that the movable pins are driven into the clamp body to an extent determined by the geometry of the object and enabling the contacting surface of the pins to at least partially conform to the surface geometry of the object.

The method further includes: continuing to move the object in a direction generally parallel to the centerline of the clamp until the object contacts the maximum extremity of the clamp body; and maintaining the object in contact with the maximum extremity of the clamp body while removing the actuation force and thereby enabling the motion of the locking device to a location where it will mechanically interfere with the motion of at least one of the movable pins. The method further includes applying a clamping force to the object in a direction parallel to the centerline of the clamp to fixedly maintain the relative positions of the object and clamp.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
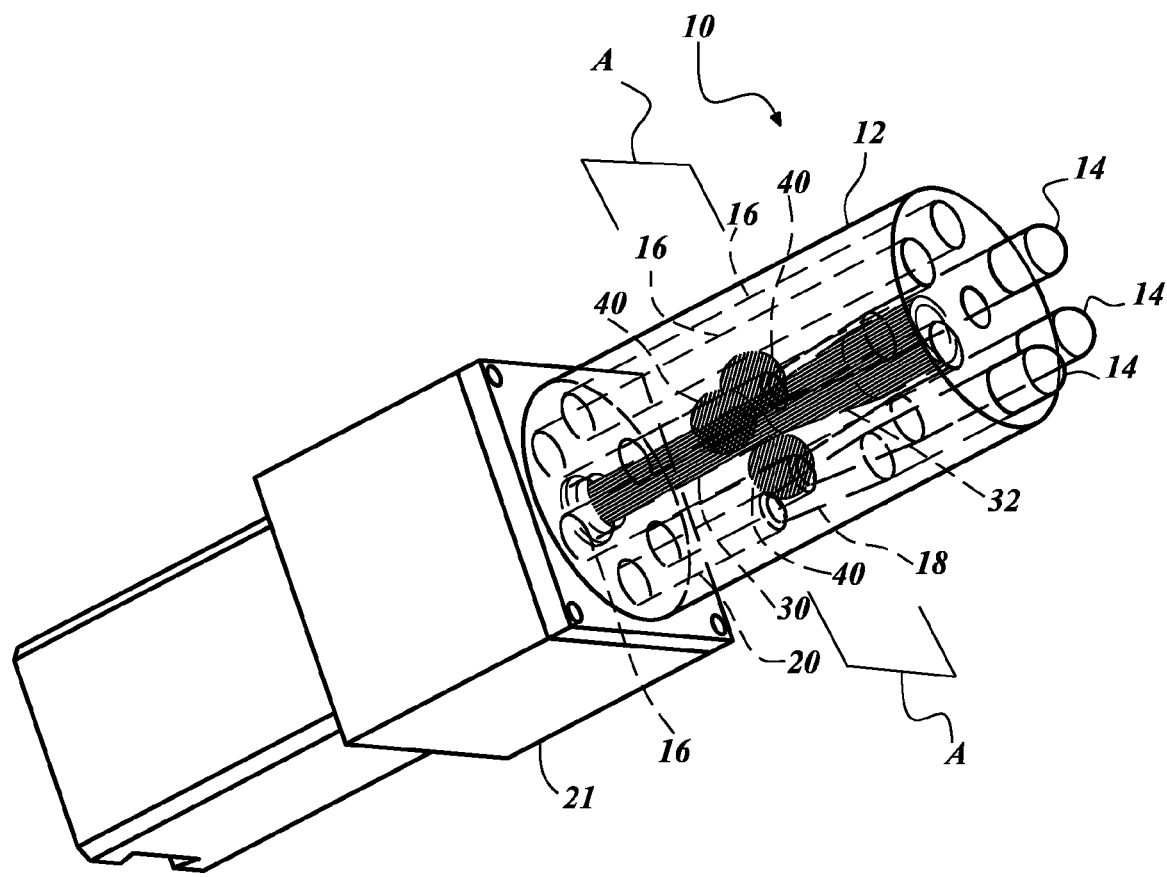
FIG. 1 is a partial or fragmentary perspective cut-away view of the reconfigurable clamp as described below, with the actuator and locking elements shaded for clarity.
Figure 2:
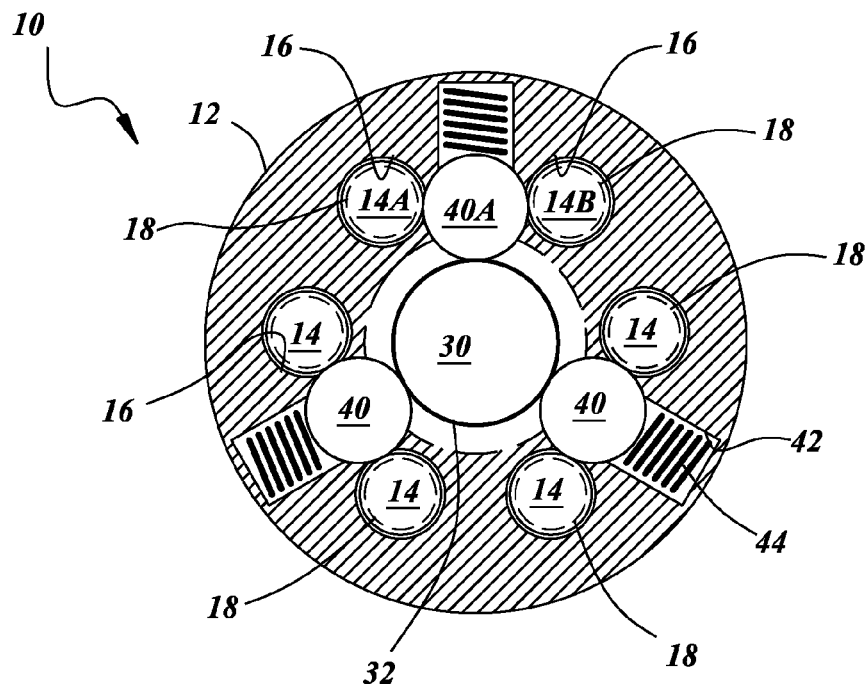
FIG. 2 is a sectional view of the reconfigurable clamp taken along the plane A-A shown in FIG. 1.
Figure 3:
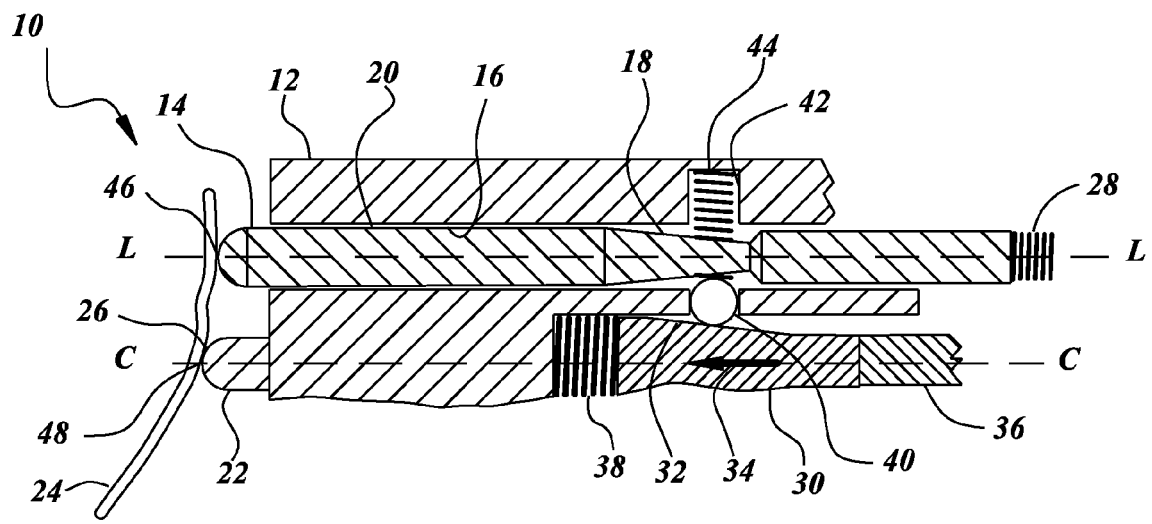
FIG. 3 is a partial or fragmentary sectional view of the reconfigurable clamp taken generally along the plane of the paper shown in FIG. 1.

FIG. 1 is a partial or fragmentary perspective cut-away view of the reconfigurable clamp 10. FIG. 2 is a sectional view of the reconfigurable clamp 10 taken along the plane A-A shown in FIG. 1, wherein like reference numbers refer to like items. FIG. 3 is a partial or fragmentary sectional view of the reconfigurable clamp 10 taken generally along the plane of the paper shown in FIG. 1, wherein like reference numbers refer to like items.

As shown in FIGS. 1-3, the reconfigurable clamp 10 includes a clamp body 12. The clamp 10 includes a plurality of movable pins 14 which slidably fit within through holes 16 formed within the clamp body 12. The plurality of movable pins 14 may be aligned substantially parallel to one another. The movable pins 14 include a tapered section 18 and a straight section 20 of uniform cross-section. The clamp 10 is attached to a base 21, shown in FIG. 3. The preferred embodiment includes six movable pins. For clarity of view, only three movable pins 14 are shown in FIG. 3. Any suitable number of movable pins may be employed within the scope of the invention.

Referring to FIG. 3, the clamp 10 further includes a geometric feature such as a fixed pin 22 which enables precise placement of the clamp 10 relative to an object or body being clamped such as a sheet metal part 24. The geometric feature to enable precise placement may also be integrally formed as part of the clamp body 12. The end 26 of this fixed pin 22 serves as a reference location capable of identifying the location of the clamped sheet metal part 24 in the reference frame of the tooling and thus for specifying the operating location of the clamp 10.

The movable pins 14 are aligned in a direction parallel to the centerline C-C of the clamp body 12. Each of the movable pins 14 is capable of individual motion without inducing motion in any other pin. The through holes 16 afford sufficient clearance to permit longitudinal motion between an upper and lower limit, or a maximum and minimum displacement, while restraining lateral or motion orthogonal to the long axis of the movable pin 14. Thus each of the movable pins 14 is capable of a specified range of motion in a direction parallel to their long or longitudinal axis L-L. The movable pins 14 may be displaced to any desired position in the specified range of motion and may be locked in that position.

Each of the plurality of movable pins 14 may be locked to inhibit longitudinal motion and unlocked to permit longitudinal motion. When unlocked, the movable pins 14 are biased, for example by pin spring 28 shown in FIG. 3, toward their upper limit or maximum displacement by a force sufficient only to overcome any friction between the movable pins 14 and through holes 16.

As shown in FIGS. 1-3, the reconfigurable clamp 10 further includes an actuator 30 which has a tapered portion 32. The actuator 30 may be a conical element or have a generally conical shape. The actuator 30 is capable of motion in the direction indicated by arrow 34 when displaced by actuation rod 36 against the urging of actuator spring 38. The actuation rod 36 may be operably connected to and driven by a suitable hydraulic, mechanical or electromechanical device such as an air cylinder, a lever, a motor or a solenoid (not shown).

As shown in FIGS. 1-3, the reconfigurable clamp 10 includes a locking element 40 constrained between the tapered section 18 on the movable pin 14 and the tapered portion 32 on the actuator 30 in order to provide mechanical interference between the movable pin 14 and the actuator 30. In FIG. 1, the actuator 30 and locking elements 40 are shaded. For clarity, the springs described below (the pin spring 28, the actuator spring 38 and the locking spring 44) are not shown in the partial or fragmentary cut-away perspective view of FIG. 1.

The locking element 40 may be substantially spherical in shape. The locking element 40 may be hardened. Referring to FIGS. 2-3, the locking element 40 prevents motion of the movable pins 14 into the through holes 16 against the urging of pin spring 28, thereby locking the movable pin 14. As stated above, the pin spring 28 is selected to provide only sufficient force to overcome any friction or other resistance to motion of the movable pin 12 into the through hole 16. Locking elements 40 are constrained longitudinally to a defined plane by openings 42 in the clamp body 10 and urged toward the centerline axis C-C of the clamp body 12 by locking spring 44, shown in FIGS. 2-3. The locking spring 44 is optional; other suitable alternatives may be used.

The movable pins 14 may be unlocked by displacing the tapered actuator 30 against an actuator spring 38 (shown in FIG. 3) by applying an action to the tapered actuator 30 through a suitable external source. An external source (not shown) such as a hydraulic, mechanical or electromechanical actuation device such as an air cylinder, a lever, an electric motor or solenoid, or any other suitable source may be used. When the tapered actuator 30 is displaced, it loses contact with the locking element 40 and no longer generates the mechanical interference with the tapered section 18 of the movable pin 14. Thus the movable pins 14 will remain unlocked for as long as the external actuation device remains powered.

In the unlocked condition, the individual movable pins 14 are urged by individual pin springs 28 (shown in FIG. 3) to adopt a configuration in which they protrude beyond the furthest extent of the fixed pin 22 in a direction generally parallel to the longitudinal axis L-L of the movable pins 14, absent an externally-applied load. Final location of the ends 46 of the movable pins 14 is determined by the shape of the body or sheet metal part 24 to be clamped and can be above or below the tip of the fixed pin 22, shown in FIG. 3. A body or sheet metal part 24 approaching the clamp body 12 along an axis generally corresponding to the longitudinal axis L-L of the movable pins will first contact a movable pin 14. Other movable pins 14 will be engaged sequentially or simultaneously before the body or sheet metal part 24 contacts the fixed pin 22.

The clamped surface is represented as a series of discrete points corresponding to the ends 46 (shown in FIG. 3) of the plurality of movable pins 14. The ends 46 of the movable pins 14 are shaped to a form which minimizes the possibility of damage to the sheet metal panel due to dents, kinks or bends and will generally correspond to a generally curved form which smoothly blends to the surface defining the pin surface in the longitudinal direction. In the preferred embodiment, the cross-section of the movable pins 14 in both the straight section 20 and tapered sections 18 is generally circular. However, different cross-sections may be employed within the scope of the invention, where the through holes 16 have a shape complementary to the cross-section employed.

As stated above, each of the movable pins 14 may move independently of the other movable pins 14. Each movable pin 14 has a tapered section 18 whose width varies along the length of the section. Since each locking element 40 may contact the tapered section 18 of each movable pin 14 in a different location, the position of the locking element 40 is not fixed. Thus the lateral location of each of the locking elements 40 relative to the centerline axis C-C, shown in FIG. 3, of the clamp body 12 will depend on the point at which the locking element 40 contacts the tapered section 18 of each individual movable pin 14. The actuator 30 is movable laterally to accommodate the varying positions of the locking element 40, in order to find a location such that it acts on all three of the locking elements 40. Thus the actuation rod 36 is not rigidly or fixedly connected to actuator 30, so that the actuator 30 retains some lateral freedom of movement.

As shown in FIG. 2, the preferred embodiment includes three locking elements 40 to ensure that the location of the actuator 30 relative to the centerline axis C-C of the clamp body 12 is uniquely defined. There are six movable pins 14 in the preferred embodiment, thus each of the locking elements 40 is in contact with two of the movable pins 14, as shown in FIG. 2. Variable combinations of numbers of movable pins and locking elements may be employed. As shown in FIG. 3, the locking element 40 has a generally circular section in the plane of contact between the tapered section 18 of the movable pin 14 and the actuator 30. Further, since point contact will occur, three points of contact will enable the locking element 40 to achieve a unique location such that pressure may be transmitted from the actuator 30 and applied equally against the tapered sections 18 of the two individual movable pins 14, as illustrated by the contact between locking element 40A and the tapered sections 18 of movable pins 14A and 14B shown in FIG. 2.

Operation

In the unlocked state, the powering of actuation rod 36 by a hydraulic, mechanical or electromechanical device in order to displace actuator 30 in the direction of arrow 34 against the urging of actuator spring 38 will enable the locking elements 40 to move toward the centerline C-C of the clamp body 12, under the urging of locking spring 44, shown in FIGS. 2-3. This removes the interference between tapered section 18 of the movable pins 14 and the tapered portion 32 of the actuator 30, thereby enabling the movable pins 14 to move under the urging of a respective pin spring 28 to their maximum permissible extent in the direction of arrow 34 (shown in FIG. 3). The locking elements 40 may also be trapped between the actuator 30 and the movable pins 14 in the absence of a locking spring 44.

In operation, an object or body such as the sheet metal part 24 shown in FIG. 3 is appropriately oriented to the clamp body 12 and advanced toward the clamp body 12 along an axis preferably generally corresponding to the longitudinal axis L-L of the movable pins 14 where it will contact at least one of the unlocked movable pins 14. The object or body of the desired shape may be composed of any suitable material, for example, a sheet metal panel or a solid body into which the shape of the sheet metal has been rendered. The axis of advance of the sheet metal part 24 should be such as to locate the point of contact 48 of the fixed pin 22 with the sheet metal part 24 at a predetermined part location, which is preferably a location of minimal local curvature. Alternatively, the motions of the clamp body 12 and sheet metal part 24 may be interchanged such that the sheet metal part 24 is fixed and the clamp body 12 is moved toward the sheet metal part 24 along an axis generally corresponding to the longitudinal axis L-L of the movable pins 14.

Referring to FIG. 3, after first contact between the sheet metal part 24 and at least one of the movable pins 14, the sheet metal part 24 will continue to be advanced with respect to the clamp body 12 and will displace the movable pins 14 into the clamp body 12. The sheet metal part 24 will continue to contact and displace additional movable pins 14 until the sheet metal part 24 contacts the fixed pin 22 and the relative motion between the sheet metal part 24 and the clamp body 12 ceases. Preferably at the point when contact occurs between the sheet metal part 24 and the fixed pin 22, the sheet metal part 24 will contact all of the plurality of movable pins 14.

After contact between the fixed pin 22 and sheet metal part 24 has occurred, the movable pins 14 are locked in position by removing power from the external hydraulic, mechanical or electromechanical actuation device, thereby enabling the actuator 30, under the urging of its actuator spring 38 (shown in FIG. 3) to move and fully contact each locking element 40. In turn, the locking elements 40 will be driven into contact with a tapered section 18 on at least one movable pin 14. This will result in a mechanical interference between a movable pin 14 and a respective locking element 40 and prevent further motion of the movable pin 14 into the clamp body 12. By moving the actuator 30 to its locking position, the movable pins 14 are locked and capable of withstanding an external load applied in a direction generally parallel to the longitudinal axis L-L of the movable pins 14 which otherwise would result in the movable pins 14 becoming more deeply recessed into the clamp body 12.

Thus, placement of the sheet metal part 24 against fixed pin 22, while actuation rod 36 continues to act on actuator 30 and urge it against actuator spring 38, will enable the displacement of movable pins 14 against the urging of pin spring 28 in a direction opposite to that indicated by arrow 34 to an extent depending on the geometry of the sheet metal part 24 (shown in FIG. 3). Terminating the action of actuation rod 36 on actuator 30 by reversing the action of the hydraulic, mechanical or electromechanical device will enable actuator spring 38 to displace actuator 30 in a direction opposite to that indicated by arrow 34 thereby trapping the locking elements 40 between the tapered portion 32 on the actuator 30 and the tapered section 18 on the movable pins 14. This establishes a mechanical interference between actuator 30 and the movable pins 14 and prevents additional motion of movable pins 14 under the action of a clamp load applied in a direction opposite to that shown by arrow 34. Preferably the movable pins 14, as a group, should support of load of at least 650N.

The sheet metal part 24 or assembly is now supported but not clamped. For clamping, a second element (not shown) appropriately shaped to conform well to the local geometry at the point of application must be brought into contact with the opposing side of the sheet metal part 24 or assembly device and a force sufficient to inhibit motion must be applied between the reconfigurable clamp 10 and the second element.

The second element may be a reconfigurable clamp 10 as previously described or a fixed-geometry clamp to which the necessary geometry has been imparted by machining, casting, molding or other suitable process. Alternatively the second element may be a block of compliant material which will assume the desired geometry under the applied clamping load or a pivotally-mounted generic geometry block such as a tripod.

The sequence of operation of the clamp members may be reversed without loss of generality. That is, the support member may be a fixed geometry block or a compliant material block or a pivotally-mounted generic block and the clamp member may be the reconfigurable block as described herein.

It should be noted that the locked condition is achieved through the urging of actuator spring 38 (shown in FIG. 3), without the need for any action of the hydraulic, mechanical or electromechanical device. Thus the locking action may be achieved without the application of external power to the reconfigurable clamp 10. Hence the reconfigurable clamp 10 maintains its geometry even in the case of a power failure which incapacitates the external source of power.

In the above description it has been assumed that the transfer of the shape of the sheet metal part 24 to be supported and the clamp 10 is achieved through contact between the sheet metal part 24 and the reconfigurable clamp 10. Alternatively, a solid block into which a representation of the relevant section of the sheet metal part 24 has been rendered may also be used. Such a procedure may be desirable if it is desired to set the form of the reconfigurable clamp 10 off-line and bring it to the operating location with the shape already preset.

Alternative Embodiments

Figure 4:
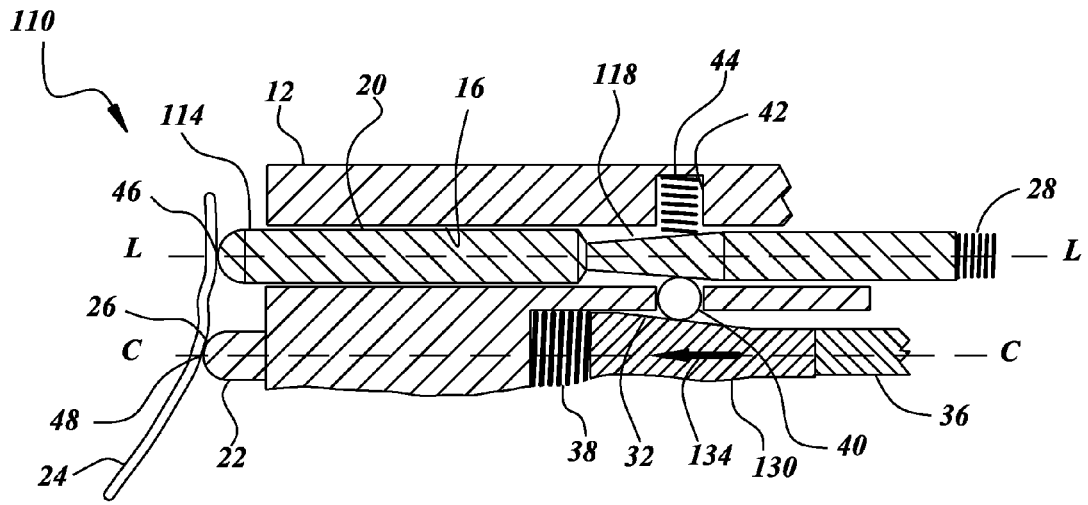
FIG. 4 is a partial or fragmentary sectional view of the reconfigurable clamp taken generally along the plane of the paper shown in FIG. 1, in accordance with a second embodiment of the invention.

In alternative embodiments, the tapered section 18 on the movable pins 14 and the tapered portion 32 on the actuator 30 may be oriented in opposite directions. A second embodiment is shown in FIG. 4, wherein like reference numbers refer to like components from FIGS. 1-3. In the reconfigurable clamp 110 shown in FIG. 4, the tapered section 118 on the movable pins 114 is oriented in opposition to the tapered section 18 on the movable pins 14 shown in FIG. 3. However the orientation of the tapered portion 32 on actuator 30 is maintained in the second embodiment in FIG. 4.

Figure 5:
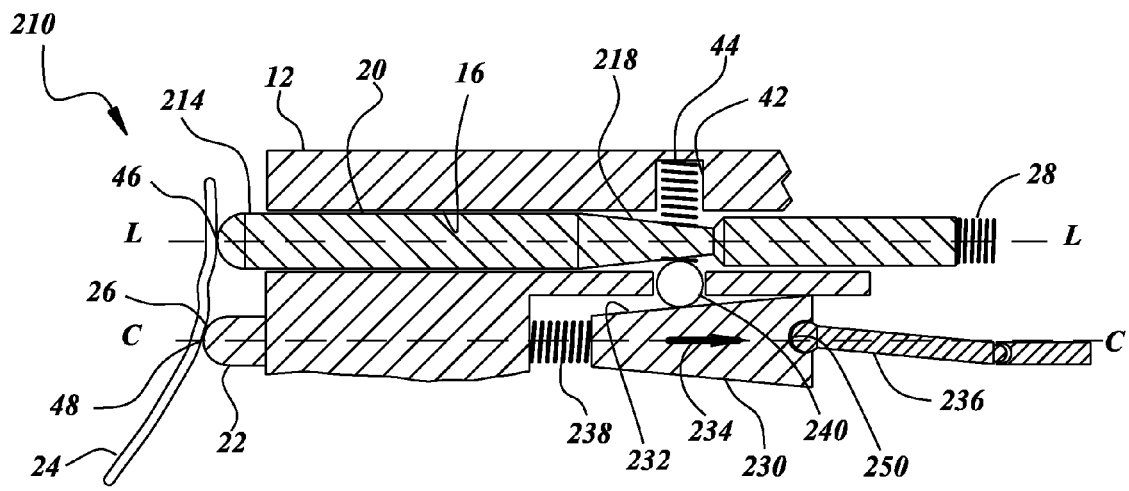
FIG. 5 is a partial or fragmentary sectional view of the reconfigurable clamp taken generally along the plane of the paper shown in FIG. 1, in accordance with a third embodiment of the invention.

A third embodiment is shown in FIG. 5, wherein like reference numbers refer to like components from FIGS. 1-3. In the reconfigurable clamp 210 shown in FIG. 5, the tapered portion 232 on the actuator 230 is oriented in opposition to the tapered portion 32 on the actuator 30 shown in FIG. 3. However the orientation of the tapered section 18 on the movable pins 14 is maintained in the third embodiment at 218 in FIG. 5. Note that for the configuration shown in FIG. 5 in which actuator 230 incorporates a tapered portion 232, the direction of actuation of the reconfigurable clamp 210 is different in that actuator 230 is now to be displaced in a direction opposite to the direction of arrow 234 in opposition to the urging of actuator spring 238. In this configuration, the actuation rod 236 must be coupled directly to actuator 230. To ensure that the actuator 230 retains freedom to center itself relative to the three locking elements 240, actuation rod 236 should either be compliant under lateral loading or the connection between actuation rod 236 and actuator 230 should permit some lateral motion. Lateral motion may be enabled using the double ball and socket connection 250 shown in FIG. 5. Alternative suitable connections may also be used.

While the best modes for carrying out the invention have been described in detail, those familiar with the art to which this invention relates will recognize various alternative designs and embodiments for practicing the invention within the scope of the appended claims.

The invention claimed is:

1. A reconfigurable clamp comprising:
a clamp body including a plurality of through holes formed within said clamp body;
a plurality of movable pins which slidably fit within said through holes in said clamp body, each of said movable pins being lockable in respective positions along a direction parallel to a longitudinal axis of the movable pins;
wherein said movable pins each incorporate a tapered section along a length of each of said respective movable pins;
a locking element configured to interact with the tapered section of at least two of said movable pins to facilitate locking of said respective movable pins; and
wherein said clamp is reconfigurable by movement of said movable pins to conform to a surface geometry of an object of arbitrary shape through contact with said object.

2. The reconfigurable clamp of claim 1:
wherein said movable pins are aligned in a direction substantially parallel to a centerline of said clamp body; and
wherein said movable pins have a specified range of motion between a maximum and minimum displacement in a direction parallel to said longitudinal axis of said movable pins.

3. The reconfigurable clamp of claim 1, further comprising a geometric feature at least partially located within said clamp body to serve as a reference location.

4. The reconfigurable clamp of claim 1, wherein one end of each of said movable pins is a curved surface.

5. The reconfigurable clamp of claim 1, further comprising:
an actuator incorporating a tapered portion in a direction parallel to a centerline of said clamp body; said actuator being selectively movable in first and second directions with respect to the clamp body; and
wherein said locking element is trapped substantially between said tapered section of at least one of said movable pins and said tapered portion of said actuator when said movable pins are locked.

6. The reconfigurable clamp of claim 5, wherein said actuator has a generally conical shape.

7. The reconfigurable clamp of claim 5, further comprising:
an actuator spring to bias said actuator for motion in a direction parallel to said centerline of said clamp body; and
wherein said actuator is configured to be powerable by a source to enable the motion of said actuator in a direction parallel to said centerline of said clamp body when said actuator is displaced against the biasing of said actuator spring.

8. A reconfigurable clamp comprising:
a clamp body including a plurality of through holes formed within said clamp body;
a plurality of movable pins which slidably fit within said through holes in said clamp body, each of said movable pins being lockable in respective positions along a direction parallel to a longitudinal axis of the movable pins;

wherein said movable pins each incorporate a tapered section along a length of each of said respective movable pins;

a locking element configured to interact with the tapered section of at least one of said movable pins to facilitate locking of said movable pins;

an actuator incorporating a tapered portion in a direction parallel to a centerline of said clamp body; said actuator being selectively movable in first and second directions with respect to the clamp body;

wherein said locking element is trapped substantially between said tapered section of at least one of said movable pins and said tapered portion of said actuator when said movable pins are locked;

wherein said locking element is substantially spherical; and wherein said clamp is reconfigurable by movement of said movable pins to conform to a surface geometry of an object of arbitrary shape through contact with said object.

9. The reconfigurable clamp of claim 8, wherein a mechanical interference is created by the interaction of said locking element, said tapered portion of said actuator and said tapered section of at least one of said movable pins, resulting in a configuration preventing motion of said at least one of said movable pins in at least one direction along the long axis of said at least one of said movable pins.

10. The reconfigurable clamp of claim 9, wherein the clamp may maintain said configuration in the absence of any externally applied force.

11. The reconfigurable clamp of claim 10:

wherein said actuator is at least partially located within said clamp body;

wherein said actuator is loosely constrained by said clamp body to motion substantially in a direction parallel to the clamp centerline; and wherein said actuator is laterally movable to accommodate varying positions of said locking element.

12. The reconfigurable clamp of claim 11, further comprising:

a pin spring connected to said movable pins to bias said movable pins towards said maximum displacement of said movable pins when said movable pins are unlocked; and wherein said locking element prevents motion of said movable pins into said through holes in said clamp body against the bias of said pin springs, thereby locking said movable pins.

13. The reconfigurable clamp of claim 12, wherein the locking element may adopt a position in which said locking element is in contact with at least one of the tapered sections of the plurality of movable pins and said movable pins are locked; and wherein the locking element may adopt at least one position in which said locking element is not in contact with at least one of the tapered sections of the plurality of movable pins and said movable pins are unlocked.

14. A reconfigurable clamp comprising:

a clamp body having a centerline, wherein said clamp body includes a plurality of through holes formed within said clamp body, and wherein said clamp body defines an aperture substantially perpendicular to said centerline;

a plurality of movable pins which slidably fit within said through holes in said clamp body, said movable pins being lockable in a position along a direction parallel to a longitudinal axis of said movable pin, wherein said movable pins each incorporate a tapered section along a length of each of said respective movable pins to facilitate locking of said movable pins;

an actuator incorporating a tapered portion in a direction parallel to said centerline of said clamp body, said actuator being selectively movable in first and second directions with respect to the clamp body, wherein said actuator has a generally conical shape; and a locking element substantially contained within said aperture of said clamp body and having a locking spring connected to said locking element, wherein said locking element is urged towards said centerline of said clamp body by said locking spring, and is trapped substantially between said tapered section of at least one of said movable pins and said tapered portion of said actuator when said movable pins are locked, and wherein said clamp is reconfigurable by movement of said movable pins to conform to a surface geometry of an object of arbitrary shape through contact with said object.

15. The reconfigurable clamp of claim 14, wherein said locking element is substantially spherical.

16. The reconfigurable clamp of claim 14, further comprising:

an actuator spring connected to said actuator for biasing said actuator to motion in a direction parallel to said centerline of said clamp body; and wherein said actuator is configured to be powerable by a source to enable the motion of said actuator when said actuator is displaced against the biasing of said actuator spring.

* * * * *